United States Patent [19]

Love

[11] 4,415,346
[45] Nov. 15, 1983

[54] CARBON DIOXIDE SNOW HORN FOR DRY ICE PRODUCTION

[76] Inventor: James H. Love, 3909 Woodland Ave., Western Springs, Ill. 60558

[21] Appl. No.: 950,513

[22] Filed: Oct. 11, 1978

[51] Int. Cl.³ .............................................. F25J 1/02
[52] U.S. Cl. ...................................................... 62/35
[58] Field of Search ..................................... 62/50, 36

[56] References Cited

U.S. PATENT DOCUMENTS

| | | | |
|---|---|---|---|
| 1,818,816 | 8/1931 | Rufener et al. | 62/10 |
| 2,145,096 | 1/1939 | Schutz | 62/10 |
| 3,443,389 | 5/1969 | Townsend et al. | 62/10 |
| 3,492,829 | 2/1970 | Stanford, Jr. | 62/10 |

Primary Examiner—Frank Sever
Attorney, Agent, or Firm—Keil & Witherspoon

[57] ABSTRACT

A snow horn of improved design having a concentric gas venting system formed integrally therewith. The snow horn is utilized for producing solid $CO_2$ particles $CO_2$ in its liquid form. The device has a downwardly directed skirt with a cylindrical, or preferably, a truncated, conically tapered shape which is open at its lower, larger diameter end. A hemispherically-shaped head is mounted at the top, smaller diameter end of the skirt and an orifice means is mounted substantially at the radial center of the head for allowing the expansion of the liquid $CO_2$ inside the head and skirt. The gas venting system consists of a concentric hood mounted at its lower edge to an outwardly directed annular flange which is secured about the lower end of the snow horn skirt so as to form an enclosed chamber about said head and skirt. A port means opens into the enclosed chamber at its lower end and an exhaust means opens into said enclosed chamber at its upper end for drawing the $CO_2$ gas through the port means and out of the enclosed chamber.

11 Claims, 5 Drawing Figures

CARBON DIOXIDE SNOW HORN FOR DRY ICE PRODUCTION

The present invention relates generally to an apparatus for safely and efficiently producing solid $CO_2$ particles or snow flakes from $CO_2$ in its liquid form and, more particularly, to a snow horn of improved design having a concentric gas venting system formed integrally therewith.

BACKGROUND OF THE INVENTION

The expansion of liquid $CO_2$ in a so-called snow horn for the purpose of producing solid $CO_2$ particles is a well-known practice, examples of such systems being generally shown in U.S. Pat. Nos. 3,492,829 and 3,786,644. Such particles or snow flakes are generally used as a consumable refrigerant, being allowed to fall by gravity upon a product (such as meat) where they dissipate and exchange thermal energy with the product so as to cool it.

Generally, liquid $CO_2$ is stored at an equilibrium temperature of about 0° F. and pressure of about 300 psig. When expanded to atmospheric pressure, no more than a theoretical maximum of 47 percent by weight of solid dry ice may be obtained, the remainder of the material going indirectly from the liquid state to a gas having a specific gravity of 1.53 and a temperature of minus 109° F. Since this waste gas is much heavier than air, it will accumulate at low points in the work area and will, particularly in the presence of water vapor, create a thick white fog. Although $CO_2$ gas is not toxic per se, it can cause hyperventilation and similar physiological effects in workers exposed to it for prolonged periods of time. Therefore, governmental regulations require that it be held to a certain minimal level in the working area for employee safety, thereby requiring that appropriate ventilation steps by taken.

The dry ice crystals formed after liquid $CO_2$ has been expanded through an orifice are of little value since the bulk of them will become entrained in the waste gas and be carried away as it is exhausted from the work area. Therefore, it is necessary to agglomerate such individual crystals into flakes that will fall by gravity out of the waste gas as dry ice snow. This is usually accomplished by impinging the crystals upon a surface located close to the expansion orifice, such as the inside surface of a snow horn, thereby allowing the flakes to form and fall out of the open bottom of the device.

Although it is known that the size and number of orifices and the shape of the snow horn affect the production rate and velocity of the dry ice snow leaving the snow horn, conventional snow horns have not been able to approach the theoretical maximum solid particle production ratio possible. When converting liquid $CO_2$, such conventional snow horns typically achieve a conversion ratio of less than 40 percent solid dry ice by weight.

BRIEF DESCRIPTION OF THE INVENTION

In accordance with the present invention, a snow horn of improved design is provided which has a concentric gas venting system formed integrally therewith. In general, the snow horn has a hemispherically-shaped head which insures that all of the particles impinging upon it are deflected with substantially downwardly directed vectors thereby avoiding any turbulence in the head area which otherwise would further divide the particles and promote their entrainment in the waste gas stream. The side wall of the snow horn is cylindrical or, preferably, is conically tapered in order to prevent the $CO_2$ crystals from building up along its inner surface and thereby reducing the diameter of the horn due to the static charge the particles acquire during handling. It is important that the inner diameter of the horn not be restricted since this would correspondingly increase the exit velocity of the particles which inhibits the gravity separation of them from the waste gas stream.

It has further been found that the preferred arrangement of the present invention not only allows the exit velocity of the particles to be controlled and the yield of the solid flake production to be increased, but that the sound level of the operation created by the expansion process can be greatly reduced.

The present invention also includes a concentric gas venting system formed integrally therewith. The general purpose of this venting system is to remove the waste $CO_2$ gas from the area directly adjacent to the lower end of the snow horn skirt from which the solid $CO_2$ particles and gas exit from the snow horn device. Another unique purpose served by the venting system of the present invention is that in the process of venting the waste $CO_2$ gas from the lower end of the snow horn skirt, it causes the waste gas to abruptly change its direction of flow at least 180 degrees and preferably 270 degrees thereby further insuring that maximum separation of the solid $CO_2$ particles from the waste gas stream. This is achieved since the abrupt change of direction of the gas will cause the solid $CO_2$ particles to be pulled from the waste gas stream due to centrifugal force acting thereon.

The concentric gas venting system of an embodiment of the present invention generally consists of an outwardly directed annular flange mounted about the lower end of the snow horn skirt which has a concentric hood mounted at its lower edge to the annular flange in a manner such that it forms an enclosed chamber about the snow horn head and skirt. A plurality of ports open into the enclosed chamber at its lower end and an exhaust means opens into the enclosed chamber at its upper end for drawing the waste $CO_2$ gas through the ports and out of the enclosed chamber during the operation of the device.

Other features and advantages are inherent in the subject matter claimed and disclosed or will become apparent to those skilled in the art from the following detailed description of the preferred embodiment taken in conjunction with the accompanying diagrammatic drawings.

DESCRIPTION OF THE PREFERRED EMBODIMENT

Figure 1:
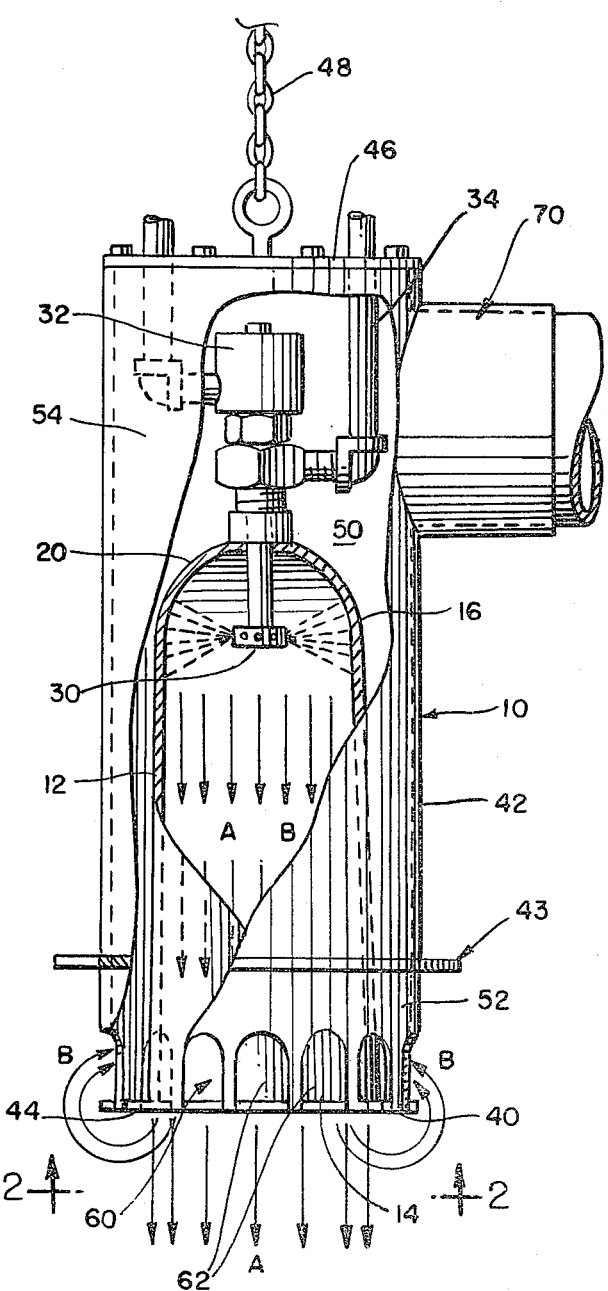
FIG. 1 is a cut-away side elevational view of a snow horn constructed in accordance with an embodiment of the present invention.
Figure 2:
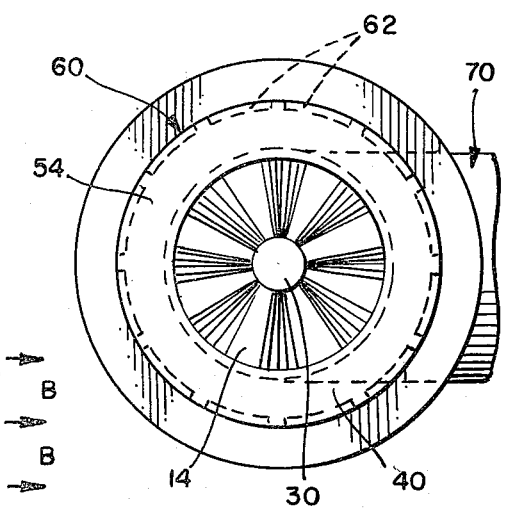
FIG. 2 is a bottom view of the device illustrated in FIG. 1 taken along line 2—2 thereof.
Figure 3:
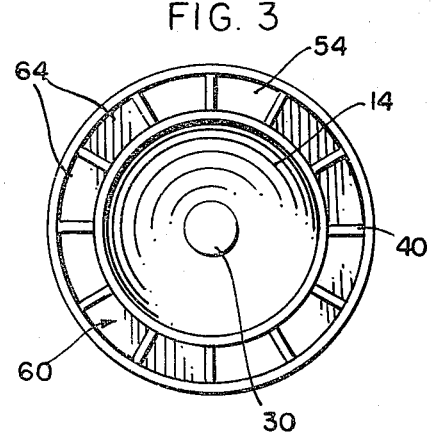
FIG. 3 is a bottom view similar to FIG. 2 illustrating an alternate embodiment of the present invention.

Referring initially to FIGS. 1-3, in the preferred embodiment of the present invention, a snow horn arrangement 10 is provided which has a downwardly directed skirt portion 12 of a truncated, conically tapered shape. Skirt 12 has an open lower, large diameter end 14 from which the solid $CO_2$ particles (illustrated by arrows A) and the waste $CO_2$ gas (illustrated by arrows B) exist. A hemispherically-shaped head 20 is mounted at the top, smaller diameter end 16 of the skirt 12 and an orifice means 30 is mounted substantially at the radial center of the hemispherically-shaped head 20 which allows for the expansion of the liquid $CO_2$ inside the snow horn head and skirt.

In the preferred embodiment of the present invention, the diameter of the conically tapered skirt increases from 5 inches o.d. at top end 16 of skirt 12 to 6 inches o.d. at the lower end 14 thereof. The overall length of skirt 12 is approximately 12 inches.

Although various configurations of orifice means 30 may be used with the present invention, it has been found that satisfactory results may be obtained with a nozzle made of stainless steel bar stock with its center drilled out of about a ¼ inch drill size and with hex flats at its bottom that have orifices drilled therein to a size which corresponds to the desired rate of production of the solid $CO_2$ particles.

As is illustrated by the dashed lines in FIG. 1, with this configuration the particles produced as the liquid $CO_2$ expands out of orifice means 30 will impinge upon the inner surface of hemispherically-shaped head 20 thereby deflecting them with substantially downwardly directed vectors and out of the snow horn device.

Also illustrated in FIGS. 1-3 is a concentric gas venting system constructed in accordance with an embodiment of the present invention. The venting system generally comprises an outwardly directed annular flange 40 mounted about the lower end 14 of snow horn skirt 12. A concentric hood 42 is mounted at its lower edge 44 to the annular flange 40 in a manner such as an enclosed chamber 50 is formed about snow horn head 20 and skirt 12.

Port means 60 open into enclosed chamber 50 at its lower end 52 and an exhaust means 70 (partially shown in FIG. 1), which may consist of a well-known exhaust blower or other exhaust ventilation system, opens into enclosed chamber 50 at its upper end 54 for drawing the waste $CO_2$ gas through port means 60 and out of the enclosed chamber 50 as illustrated by arrows B.

Port means 60 may comprise a plurality of openings 62 formed about the lower edge 44 of concentric hood 42 as is illustrated in FIGS. 1 and 2 or may comprise a plurality of openings 64 formed about annular flange 40 as illustrated by the modification shown in FIG. 3. With the configuration shown in FIGS. 1 and 2, the flow of waste $CO_2$ gas will be abruptly changed by 270 degrees and by 180 degrees with the configuration shown in FIG. 3. Of course, the size and shape of openings 62 and 64 may be selected and changed in many different ways according to the type and volume of exhaust flow desired.

A solenoid valve 32 is mounted above orifice nozzle 30 so as to control the flow of liquid $CO_2$ into the snow horn through inlet pipe 34. Since the solenoid valve is mounted above nozzle 30, any liquid $CO_2$ remaining in the nozzle means will expand out of the nozzle when the solenoid valve is closed thereby preventing it from accumulating and freezing in the system which may lead to a blockage of the orifice nozzle.

As is shown in FIG. 1, the solenoid valve 32 and inlet pipe 34 are also mounted on the snow horn in the enclosed exhaust chamber 50. Due to this novel arrangement, the waste gas is used to further cool the liquid $CO_2$ before it is expanded at orifice nozzle 30 thereby allowing for more efficient production of solid particles since the yield of solid particles increases as the temperature of the liquid $CO_2$ drops prior to its expansion.

The top plate 46 of concentric hood 42 is removable in order to permit access to the solenoid valve 32 and its associated inlet piping. A chain 48 or other supporting means may be secured to top plate 46 as is shown in FIG. 1.

Figure 4:
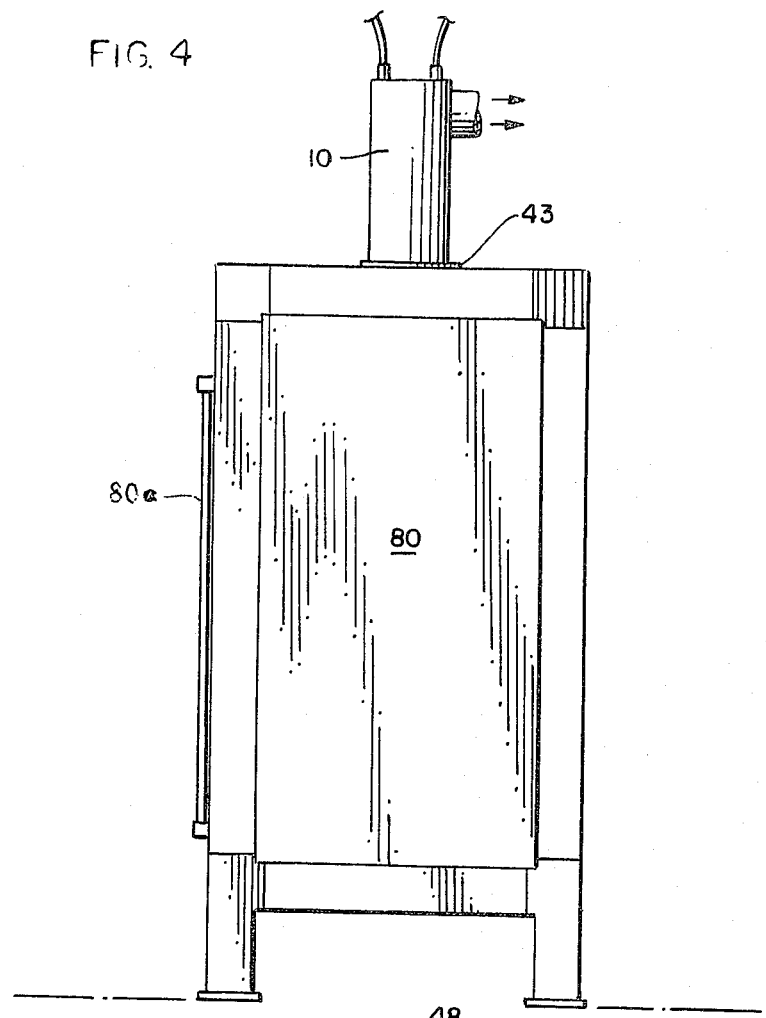
FIG. 4 is a side elevational view of the device illustrated in FIG. 1 shown mounted in an operational position.
Figure 5:
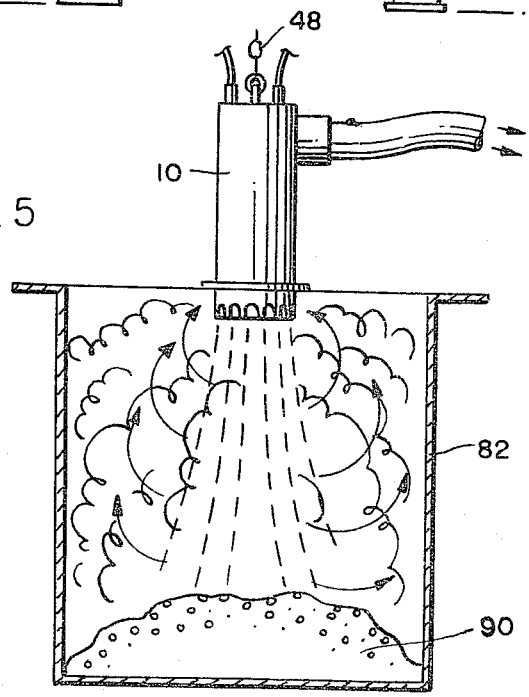
FIG. 5 is a side elevational view in partial section of the device shown in FIG. 1 shown in an alternate operational position.

Two differing modes of operating the device are shown in FIGS. 4 and 5. In FIG. 4, the device 10 is mounted through a hole in the top of an enclosed cold box 80 a side view of which is shown with a latch mechanism 80(a) for the front access door. An external annular flange 43 which is secured about the outer wall of concentric hood 42 supports the device on the top of the cold box. Since the cold box is completely sealed, no exhaust blower need be utilized to remove the waste gas since the pressure build up inside the box as the liquid $CO_2$ is expanded will force the waste gas through the invention's concentric ventilation system. Therefore, no air is lost from the surrounding work area and no waste gas in permitted to escape.

FIG. 5 shows the device 10 supported by a chain 48 over a work trough or container or hopper as in a mixer blender 82 having a product 90 in it to be chilled with dry ice snow. Since the waste dry ice gas is heavier than air, it will remain in trough 82 where it may be removed by the exhaust means of the present invention as the operator produces the dry ice snow therein. Since the waste gas in exhausted at the same point where it is produced, very little air from the surrounding work area is lost.

While several embodiments of the present invention have been shown and described, it should be understood that various changes and modifications thereto may be made and it is, therefore, intended in the following claims to include all such modifications and changes as may fall within the true spirit and scope of this invention.

What is claimed is:

1. A snow horn device for producing solid $CO_2$ particles from $CO_2$ in its liquid form, comprising:
   (a) a downwardly directed skirt having a truncated, conically tapering shape which is open at its lower, larger diameter end;
   (b) a hemispherically-shaped head mounted at the top, smaller diameter end of said skirt; and
   (c) nozzle means located effectively at the radial center of said hemispherically-shaped head, said nozzle means having orifices formed therein which are generally outwardly directed from the longitudinal axis of said skirt for allowing the expansion of said liquid $CO_2$ from said nozzle means whereby the solid $CO_2$ particles thereby formed will impinge against the inner surfaces of said head and skirt and be deflected substantially downwardly by said surfaces at a reduced velocity, thereby avoiding turbulence in the area of said head.

2. The snow horn device of claim 1 further comprising a solenoid valve mounted above said nozzle means in a manner such that said liquid CO₂ will expand downward and out of said nozzle means when said solenoid valve is closed.

3. The snow horn device of claim 1 or 2 further comprising:

an outwardly directed annular flange mounted about the lower end of said skirt;

a concentric hood mounted at its lower edge to said annular flange so as to form an enclosed chamber about said head and skirt;

a port means opening into said enclosed chamber at its lower end; and an exhaust means opening into said enclosed chamber at its upper end for drawing said CO₂ gas through said port means and out of said enclosed chamber.

4. The snow horn device of claim 3 wherein said port means comprises a plurality of openings formed about the lower edge of said concentric hood.

5. The snow horn device of claim 3 wherein said port means comprises a plurality of openings formed about said annular flange.

6. The snow horn device of claim 3 further comprising a control valve and associated inlet piping for said liquid CO₂ being mounted in said enclosed chamber, whereby the inlet liquid CO₂ is cooled by heat exchange with the exhaust gas thereby increasing the yield of dry ice crystals.

7. In a snow horn device for producing solid CO₂ particles and gas from CO₂ in its liquid form at ambient temperature and pressure, wherein the snow horn has a nozzle means mounted in a head which is mounted at the top of a skirt which has an open lower end, the improvement comprising:

(a) an outwardly directed annular flange mounted about the lower end of said skirt;

(b) a concentric hood mounted at its lower edge to said annular flange so as to form an enclosed chamber about said head and skirt;

(c) a port means opening into said enclosed chamber about the lower edge of said hood; and (d) an exhaust means opening into said enclosed chamber at its upper end for drawing said CO₂ gas through said port means and out of said enclosed chamber, whereby the direction of flow of said gas is abruptly rotated through 270 degrees from the direction of gas flow downwardly through said skirt.

8. A snow horn device as claimed in claim 1, further comprising:

an outwardly directed annular flange mounted about the lower end of said skirt;

a concentric hood mounted at its lower edge to said annular flange so as to form an enclosed chamber about said head and skirt;

a port means opening into said enclosed chamber about the lower edge of said hood; and an exhaust means opening into said enclosed chamber at its upper end for drawing said CO₂ gas through said port means and out of said enclosed chamber, whereby the direction of flow of said gas is abruptly rotated through 270° from the direction of gas flow downwardly through said skirt.

9. The snow horn device of claim 7 or 8 wherein said port means comprises a plurality of openings formed about the lower edge of said concentric hood.

10. The snow horn device of claim 7 or 8 further comprising a solenoid valve mounted above said nozzle means in a manner such that said liquid CO₂ will expand donward and out of said nozzle means when said solenoid valve is closed.

11. The snow horn device of claim 7 or 8 further comprising a control valve and associated inlet piping for said liquid CO₂ being mounted in said enclosed chamber.

* * * * *